United States Patent Office 3,249,228
Patented May 3, 1966

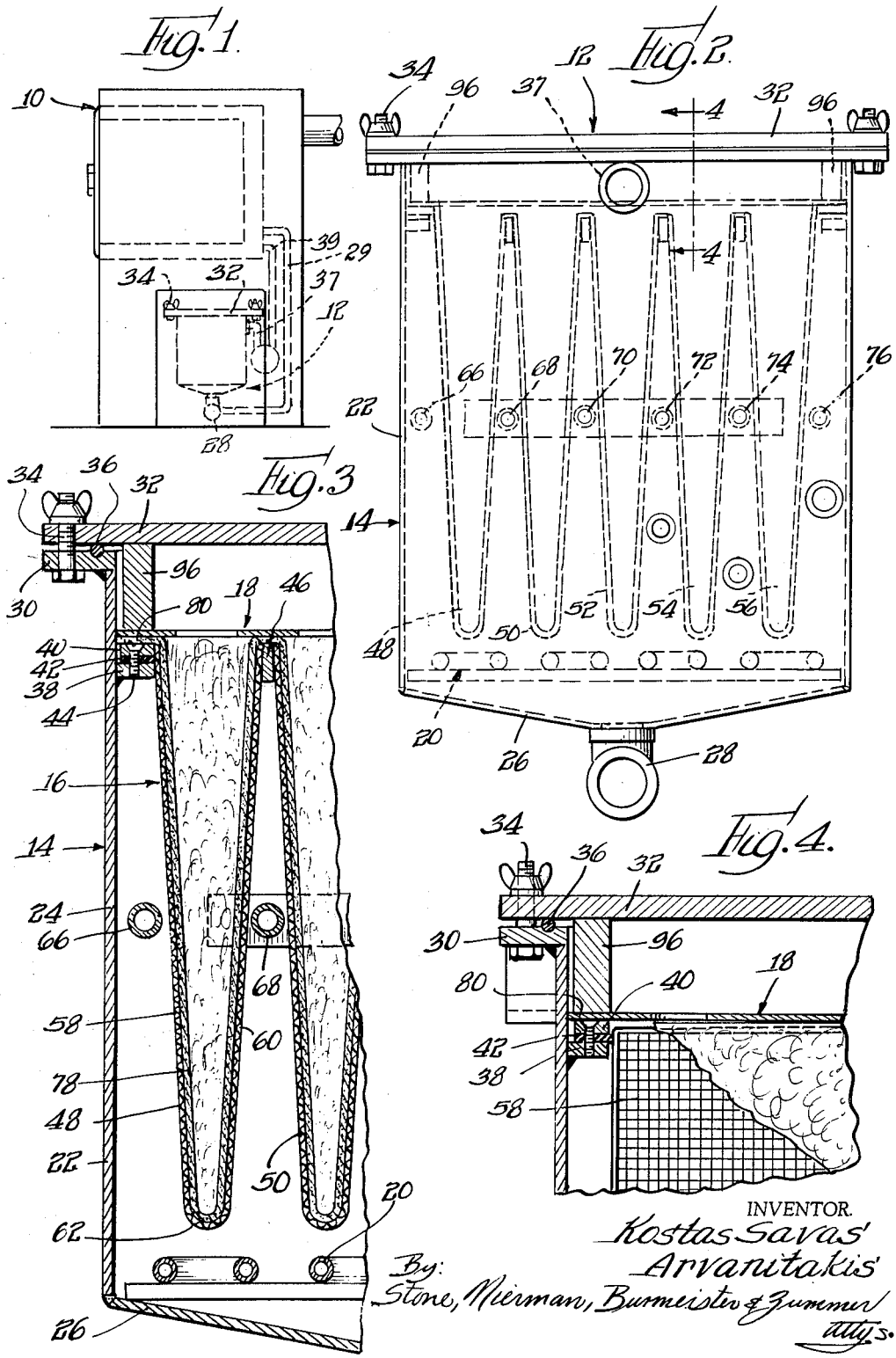

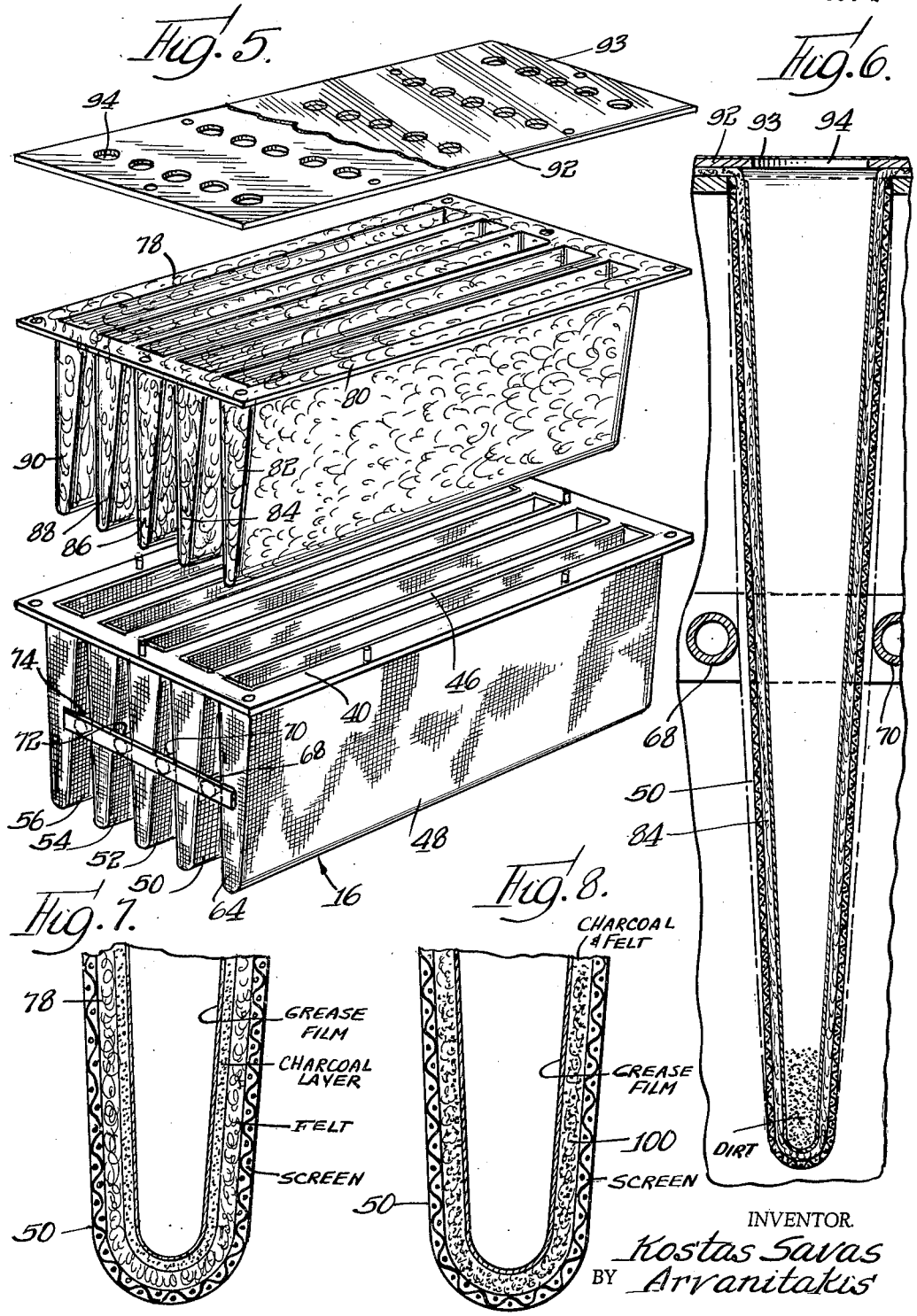

3,249,228
FILTER
Kostas Savas Arvanitakis, 10025 W. Grand Ave.,
Franklin Park, Ill.
Filed Mar. 13, 1963, Ser. No. 264,926
4 Claims. (Cl. 210—184)

This invention relates to a filter, and more particularly, to a filter for rejuvenating a dry cleaning solution after the solution has been used for cleaning clothes.

With the advent of the coin operated dry cleaning establishments, one of the problems encountered by a coin operated dry cleaning establishment is the maintenance of a good, clean, dry cleaning solution for use in dry cleaning machines. It has been accepted that the dry cleaning solution must be filtered in order to maintain the effectiveness of the dry cleaning solution. Various and sundry systems for filtering a dry cleaning solution have been provided. All of these systems, though effective, have two drawbacks. One is that the filter elements become clogged quite readily causing the efficiency of the filter to be greatly reduced. Another problem appertaining to present day filters is that activated charcoal is used to adsorb materials which go into solution during the dry cleaning process becomes ineffective. Generally speaking, the present day filters have blocks of activated charcoal contained in the filter element and these blocks are arranged in such a manner that the dry cleaning solution must flow through the block. In view of the fact that the blocks are either highly compressed or in a semi-compressed form, the dry cleaning solution readily forms flow patterns through the blocks. Once flow patterns are formed through the blocks, a goodly portion of the dry cleaning solution flows along the paths and does not come in contact with the activated charcoal. Thus, no foreign material is adsorbed by the activated charcoal, but rather the material flows unhindered through the block. In order to overcome the objections of the present day filters, the applicant has invented a new and improved construction for a filter. The applicant's principal object for this invention is to provide a dry cleaning solution filter which has a long life.

It is another object of the present invention to provide a filter which has a self-cleaning feature so that the filter does not become readily clogged.

It is a further object of the instant invention to provide a filter in which activated charcoal in the filter is in particle form to be more effective and to be in constant contact with the dry cleaning solution.

It is a still further object of the herein disclosed invention to provide a dry cleaning solution filter which may be readily installed and which may have its filter element easily changed.

Other objects and uses of the present invention will become readily apparent to those skilled in the art upon a perusal of the following specification in the light of the accompanying drawings:

FIGURE 1 is a side elevation of a coin operated dry cleaning machine having attached to the machine a filter embodying the herein disclosed invention;

FIGURE 2 is an enlarged side view of the filter shown in FIGURE 1, but with an interior portion of the filter shown in dotted form in order to show better the construction of the filter;

FIGURE 3 is a cross-sectional view of a portion of the filter shown in FIGURES 1 and 2;

FIGURE 4 is an enlarged cross-sectional view of a portion of the filter shown in FIGURES 1 and 2 taken on line 4—4 of FIGURE 2;

FIGURE 5 is an exploded view of portions of the filter shown in FIGURES 1 and 2 in order to show the relative arrangement of the parts of the filter;

FIGURE 6 is an enlarged cross-sectional view of one envelope filter shown in FIGURE 1 and a dotted line indicating the outer most expansion of the filter;

FIGURE 7 is a cross-sectional view of a trough portion of one envelope of the filter shown in FIGURE 2 showing the various layers of the filter; and FIGURE 8 is a cross-sectional view of a portion of an envelope of a filter element in which a felt pad has charcoal formed therein.

Referring now, to the drawings, it may be seen that a coin operated dry cleaning unit generally indicated by numeral 10 has a filter 12 attached thereto for rejuvenating cleaning fluid used in the unit. The filter 12 generally includes a tank or container 14, a support unit 16 mounted in the tank, a filter element 18 mounted in the tank and in engagement with the support 16, and a cooling unit 20 mounted in the tank for cooling the dry cleaning solution after the solution has been cleaned.

The construction of the tank is such that it includes a vessel 22 having upstanding side walls 24 and a sloping bottom 26 attached to the side walls. An outlet 28 is connected to the sloping bottom 26 to return rejuvenated cleaning solution to the dry cleaning unit by means of pipe 29. The upper portion of the vessel has an exterior flange 30 welded thereon and a top or cover 32 is secured to the flange by a plurality of bolts 34. An O-ring 36 is mounted in the space between the flange and the top to provide a seal therebetween. The tank includes an inlet 37 which is connected to an outlet of the dry cleaning unit by means of pipe 39. The vessel has an interior ledge 38 fixed to the interior of walls 24 adjacent to the top 32. This ledge 38 provides a mounting member for the support 16.

As may be seen in FIGURE 5, the support 16 is a resilient wire mesh support or base which has in its upper portion a mounting collar 40. The mounting collar is positioned above the ledge 38 with a gasket 42 between the lower surface of the mounting collar and the upper surface of the mounting ledge. A plurality of screws 44 fixes the mounting collar to the mounting ledge and provides appropriate pressure to form a seal between the gasket and the ledge 38. Four braces 46 are positioned in the mounting collar. These braces 46 extend the length of the collar and are spaced equidistantly from each other and adjacent portions of the collar as shown in FIGURE 5.

Five identical support envelopes 48, 50, 52, 54 and 56 are attached to the collar and braces as shown in FIGURE 5. Looking now specifically to envelope 48, it may be seen that the envelope has a pair of continuous plane members 58 and 60 which are joined at their bottoms by a trough portion 62. The plane member 58 has its upper portion attached to the collar 40 and the uppermost portion of plane member 60 is attached to brace 46 as shown in FIGURE 3. The ends of the envelope are also formed by a resilient wire mesh so that envelope 48 includes one end 64 and the opposite end is not shown though identical to end 64.

The vessel 22 has 6 stop members, 66, 68, 70, 72, 74 and 76, extending through the vessel for reasons which will become apparent hereinafter. The stop member 66 is adjacent to the plane member 58 of envelope 48 while stop member 68 is between envelopes 48 and 50. Stop member 70 is between envelopes 50 and 52. The stop member 72 is positioned between envelopes 52 and 54 and stop member 74 is positioned between envelopes 54 and 56. The last stop member, stop member 76, is positioned between the vessel and envelope 56. These stop members all provide a stop which is engageable with the plane members of the envelopes, so that as the plane members are pushed out from each other, the amount of displacement is limited by the stop members.

As was mentioned above, the filter element 18 is positioned in the vessel in engagement with the support 16. The filter element includes a felt pad base 78 which mates with the support 16. The felt pad base 78 has a collar 80 which is similar to the collar 40 of the support base 16. The felt pad has 5 envelopes, i.e., 82, 84, 86, 88 and 90 which envelopes mate, respectively, with envelopes 48, 50, 52, 54 and 56 of the wire mesh base. The felt pad has a cardboard support plate 92 fixed to the collar and the uppermost portions of the envelopes. The plate 92 has a plurality of apertures 94 formed therein which apertures communicate with the interiors of the various envelopes. A polyethylene film 93 is secured to the support plate to close each of the apertures 94. A plurality of activated charcoal particles each having a diameter between twenty and twenty-five thousandths of an inch are contained in each of the envelopes of the felt pad.

The filter element is positioned in the tank with the collar 80 positioned above the collar 40 of the support base as shown in FIGURE 3. A holding block 96 surrounding the outer periphery of the ledge 44 is placed over the collar 80, and the block engages the interior of the top 32 so that the felt pad is held in position by the top.

In operation, the instant device is used in the following manner. First, the filter element with the activated charcoal sealed inside the felt pad by plate 92 is positioned in mating engagement with the support 16. The block 96 is positioned on the collar 80 and the top 32 is positioned in engagement with block 96. The top is then fixed to the vessel. The top thus holds the collar 80 between the flange 38 and the block 96 to secure the felt pad into position. In view of the fact that the O-ring 36 is provided between the flange 30 and the top, the vessel is completely sealed.

A dry cleaning solution, in this case perchlorethylene, is introduced into the container through the inlet. The perchlorethylene dissolves the polyethylene film over the apertures 94 and the dry cleaning solution then flows into the envelopes of the felt pad through the apertures 94. The perchlorethylene dropping into the envelopes falls onto the activated charcoal causing the activated charcoal to clear the perchlorethylene. Once the envelopes become filled, the turbulence of the flow of the perchlorethylene through the apertures 94 causes the activated charcoal to go into and to remain in suspension in the perchlorethylene. Furthermore, the specific gravities of perchlorethylene and activated charcoal are similar so that the activated charcoal readily remains in suspension in the perchlorethylene. In view of the fact that the dry cleaning solution is introduced into the vessel under pressure, the perchlorethylene is forced out of the envelopes through the felt pad. The same pressure causes the plane members of each envelope to be bowed out until the plane members of the support are in engagement with their relative stop members. That is, the wire mesh support takes the form shown by the dotted line in FIGURE 6. In view of the fact that the perchlorethylene is under pressure, it flows out through the felt pad and the flow of the perchlorethylene disposes a layer of activated charcoal on the interior surface of the felt pad envelopes. The activated charcoal forms in a film on the surface as mentioned above so that all of the perchlorethylene must flow in contact with the activated charcoal. It is readily apparent that the greater the flow of fluid through a given point the more activated charcoal is deposited in that particular area. Thus, there is a self-adjusting aspect to this device in that where there is a larger flow, there is more activated charcoal. It may be appreciated that unwanted chemical compounds, such as greases, waxes and other organic compounds, are removed by the activated charcoal. However, materials such as lint, silica and carbon particles which form dirt are trapped by the felt pad. After the perchlorethylene has been cleared of dirt and undesirable materials, it flows past the cooling unit 20 where it is cooled. The perchlorethylene then flows into the outlet 28 and returned to the cleaning machine.

It has been found that after use over a period of time, the condition of each of the envelopes is such as that shown in FIGURE 7. Inside the felt pad envelope there is a layer of activated charcoal particles which remove various undesirable chemicals. Next, there exists a grease and dirt film on the outside of the activated charcoal layer.

It may be appreciated that a dry cleaning machine operates only intermittently. The machine must be stopped for loading and unloading. After the clothes have been cleaned, the machine shuts off thus stopping the pump which delivers used dry cleaning solution to the filter. When the pump stops, the pressure is relieved; the resilience of the wire mesh snaps the felt pad back to its original position as is shown in solid form in FIGURE 6. When the plane members of the member move back to their natural position, the layer of charcoal is broken up and it falls off the felt pad. This action, also, breaks up the layer of grease or wax found on the layer of activated charcoal so that the dirt which is trapped by the felt pad falls down to the bottom of the respective envelope. It is true that lint adheres to the felt pad, but dirt, such as, silica or carbon particles, falls down, so that the filter element has a self cleaning action. It is apparent that in order to continue rejuvenation of the perchlorethylene, it is necessary to provide perchlorethylene under pressure to cause turbulence to exist in the envelopes, thus disturbing the activated charcoal. The activated charcoal forms another film on the felt pad and the action is repeated as described above.

When it is necessary to remove the filter element, the top 32 is removed and the filter element is lifted out of the support 16 and discarded. Another filter element is then dropped into position with no trouble. The top is replaced and the filter is ready for use again.

Looking, now, to FIGURE 8, it may be seen how a filter element is used when activated charcoal is molded into the felt pad rather than allowing the activated charcoal to float freely in the container. The felt pad is charged with activated charcoal in the formation of the pad. The pad has the same mechanical form as that described above. However, no charcoal layer is formed in the interior surface of the felt pad but rather only a grease and dirt film is formed. When the pressure of the cleaning solution is relieved, the plane members snap back to their original position and break up the grease and dirt layer so that the dirt may drop down to the bottom of the envelope. A cleaning action of the filter element is thus accomplished.

Although a specific embodiment of the herein disclosed filter has been shown and described in detail above, it is readily apparent those skilled in the art may make various modifications and changes in the construction of the filter and the filter element without departing from the spirit and scope of the invention. It is to be expressly understood that the instant invention is limited only by the appended claims.

What is claimed is:

1. A filter element for use in removing foreign materials from a dry cleaning solution comprising, in combination, a felt pad having a plurality of substantially flat felt mats being connected to each other and having substantially flat end portions connected to the filter mats to form envelopes, a support plate secured to the upper portions of the mats to provide rigidity to the upper portion of the felt pad, said support plate having a plurality of apertures contained therein, a plurality of activated charcoal particles positioned in each of the envelopes, and said apertures of the support plate being closed by a polyethylene film being soluble in a dry cleaning solution.

2. A filter for rejuvenating a dry cleaning solution comprising, in combination, a tank having an inlet and an outlet, a resilient wire mesh having a plurality of plane members attached to each other and having its outer periphery connected to the tank, a plurality of stop means mounted in the tank adjacent to the plane members for engagement with the plane members to limit in one direction displacement of said plane members, a continuous felt pad conforming in shape to the surface of the wire mesh mounted on said wire mesh adjacent to the inlet, a support plate fixed to the continuous felt pad, said support plate having a plurality of apertures contained therein, and activated charcoal positioned between the felt pad and the support plate, whereby introduction of a dry cleaning solution under high pressure through the inlet causes the wire mesh to be displaced and the turbulence of the dry cleaning solution causes the activated charcoal to become suspended to adsorb foreign materials in the dry cleaning solution and foreign particles are trapped by the felt pad.

3. A filter for rejuvenating a dry cleaning solution comprising, in combination, a tank having an inlet and an outlet, a resilient wire mesh having a plurality of plane members attached to each other and having its outer periphery fixed to the tank to separate the inlet and the outlet, said resilient wire mesh having end members attached to the plane members to form envelopes in said mesh, a plurality of stop means mounted in the tank adjacent to the plane members for engagement with the plane members, a continuous felt pad conforming in shape to the surface of the wire mesh and positioned on said wire mesh adjacent to the inlet, said continuous felt pad having a support plate fixed to the upper portion of the felt pad to provide rigidity to the felt pad, said support plate having a plurality of apertures contained therein to allow the dry cleaning solution to pass through the support plate, and activated charcoal engageable with the felt pad on the side of the felt pad adjacent to the inlet to the tank, whereby a dry cleaning solution under pressure is introduced into the tank through the inlet and turbulence of the dry cleaning solution causes the activated charcoal particles to become suspended and the pressure of the dry cleaning solution causes the wire mesh to be displaced and placed into engagement with the stop means and the felt pad traps foerign particles contained in the dry cleaning solution, when the pressure is relieved, the wire mesh springs back to its normal position to clear the felt pad of foreign particles, thereby clearing the filter.

4. A filter for rejuvenating a dry cleaning solution comprising, in combination, a tank having an inlet near the upper portion of the tank and an outlet near the lower portion of the tank, a mounting ledge fixed to the interior of the tank adjacent to the upper portion of the tank, a resilient wire mesh having a plurality of plane members attached to each other and having its outer periphery fixed to the mounting ledge to separate the inlet and the outlet of the tank, a plurality of stop means mounted in the tank adjacent to the plane members for engagement with the plane members to limit in one direction displacement of the plane members, a continuous felt pad conforming in shape to the surface of the wire mesh adjacent to the inlet, a resilient plane support member fixed to the upper portion of the pad and overlapping the mounting ledge, said resilient plane support member having a plurality of apertures contained therein to allow the dry cleaning solution to pass through the support member and to enter the space between plane members of the felt pad, a sealing block in engagement with the outer periphery of the support member, a top fixed to said tank for closing the tank and engaging the sealing block for holding the support member and felt pad in sealing engagement with the mounting ledge, a cooling tube mounted in the tank for cooling the dry cleaning solution as it passes through the tank, and activated charcoal contained in each space between adjacent plane members and the support member, whereby a dry cleaning solution under pressure is introduced into the tank through the inlet and turbulence of the dry cleaning solution causes the activated charcoal particles to become suspended to allow the activated charcoal particles to adsorb foreign materials in solution with the dry cleaning solution and any foreign particles in the dry cleaning solution are trapped on the inlet side of the felt pad as the dry cleaning solution passes through the felt pad and the wire mesh is displaced and placed into engagement with the stop means, and release of the pressure allows the wire mesh to spring back to its normal position to clear the felt pad of foreign particles trapped on the surface of the felt pad adjacent to the inlet and to remove activated charcoal particles from the surface of the felt pad, thereby breaking up any films of wax or grease which may form on the activated charcoal.

References Cited by the Examiner

UNITED STATES PATENTS

| 1,737,313 | 11/1929 | Kamrath | 210–451 X |
| 2,081,353 | 5/1937 | Dick | 210–456 X |
| 2,329,356 | 9/1943 | Moore | 210–493 X |
| 2,410,371 | 10/1946 | Vokes | 210–493 X |
| 2,495,488 | 1/1950 | Stribling | 210–167 X |
| 2,593,227 | 4/1952 | Wagner | 210–451 X |
| 2,853,154 | 9/1958 | Rivers | 55–341 |
| 2,907,408 | 10/1959 | Engle et al. | 210—493 X |
| 3,019,127 | 1/1962 | Czerwwonka et al. | |

FOREIGN PATENTS 5,822   1896   Great Britain.

SAMIH N. ZAHARNA, *Primary Examiner.*

REUBEN FRIEDMAN, HARRY B. THORNTON,
*Examiners.*

J. L. De CESARE, S. W. WILLIAMS,
*Assistant Examiners.*